(12) United States Patent
Mills, Jr. et al.

(10) Patent No.: US 10,846,527 B2
(45) Date of Patent: Nov. 24, 2020

(54) ENTERPRISE PROFILE MANAGEMENT AND CONTROL SYSTEM

(71) Applicant: Bank of America Corporation, Charlotte, NC (US)

(72) Inventors: Robert E. Mills, Jr., Stockbridge, GA (US); Murali Santhanam, Naperville, IL (US); Kerry Kurt Simpkins, Fort Mill, SC (US); John B. Hall, Charlotte, NC (US); Michael J. Pepe, Jr., Wilmington, DE (US); Jasher David Fowles, Davidson, NC (US); Jeanne Moulton, Concord, NC (US)

(73) Assignee: Bank of America Corporation, Charlotte, NC (US)

( * ) Notice: Subject to any disclaimer, the term of this patent is extended or adjusted under 35 U.S.C. 154(b) by 146 days.

(21) Appl. No.: 16/157,384

(22) Filed: Oct. 11, 2018

(65) Prior Publication Data
US 2020/0117892 A1    Apr. 16, 2020

(51) Int. Cl.
*G06K 9/00* (2006.01)
*G06F 16/51* (2019.01)
*G06F 16/93* (2019.01)

(52) U.S. Cl.
CPC ......... *G06K 9/00483* (2013.01); *G06F 16/51* (2019.01); *G06F 16/93* (2019.01); *G06K 9/00469* (2013.01)

(58) Field of Classification Search
CPC ................. G06K 9/00469; G06K 9/18; G06K 2017/0038; G06Q 20/042
See application file for complete search history.

(56) References Cited

U.S. PATENT DOCUMENTS 5,815,592 A * 9/1998 Mennie .................. B65H 3/063
                                                    382/135
5,901,253 A    5/1999 Tretter
(Continued)

OTHER PUBLICATIONS

Apr. 17, 2020—U.S. Non-Final Office Action—U.S. Appl. No. 16/157,276.
(Continued)

*Primary Examiner* — Avinash Yentrapati
(74) *Attorney, Agent, or Firm* — Banner & Witcoff, Ltd.; Michael A. Springs

(57) ABSTRACT

Systems for profile management and control are provided. A system may receive an instrument or image of an instrument. In some examples, data may be extracted from the instrument or image of the instrument and a document profile may be retrieved based on the extracted data. Images within the document profile may be evaluated to identify a type of document for each document. In some examples, a total number of documents of each type may be determined or identified. The total number of documents may be compared to a threshold. If the total number of documents is below the threshold, the documents or images in the profile may be maintained. If the total number of documents is at or above the threshold, in some examples, each document may be further evaluated to determine or identify documents or document images for deletion. In some arrangements, the profile may be refreshed and documents or images identified for deletion may be deleted.

21 Claims, 14 Drawing Sheets

(56) References Cited

U.S. PATENT DOCUMENTS

| | | | |
|---|---|---|---|
| 6,026,189 A * | 2/2000 | Greenspan | G06K 9/00201 |
| | | | 382/226 |
| 6,430,320 B1 | 8/2002 | Jia et al. | |
| 7,920,714 B2 * | 4/2011 | O'Neil | G07D 7/2016 |
| | | | 382/100 |
| 8,155,425 B1 | 4/2012 | Mandel | |
| 8,417,017 B1 * | 4/2013 | Beutel | G06Q 20/042 |
| | | | 382/135 |
| 8,824,772 B2 | 9/2014 | Viera et al. | |
| 9,129,340 B1 | 9/2015 | Medina, III et al. | |
| 9,218,701 B2 * | 12/2015 | Cantley | G06Q 40/00 |
| 9,652,690 B2 | 5/2017 | Eid et al. | |
| 9,843,731 B2 | 12/2017 | Shimosato | |
| 2002/0146170 A1 * | 10/2002 | Rom | G06K 9/00469 |
| | | | 382/175 |
| 2004/0247168 A1 * | 12/2004 | Pintsov | G06K 9/2054 |
| | | | 382/137 |
| 2005/0243378 A1 | 11/2005 | Klein et al. | |
| 2006/0202012 A1 * | 9/2006 | Grano | G06Q 20/26 |
| | | | 235/379 |
| 2006/0255124 A1 | 11/2006 | Hoch et al. | |
| 2007/0136198 A1 | 6/2007 | Foth et al. | |
| 2008/0025555 A1 * | 1/2008 | Visan | G06K 9/6202 |
| | | | 382/100 |
| 2012/0170829 A1 | 7/2012 | Jackson et al. | |
| 2012/0177281 A1 | 7/2012 | Frew | |
| 2014/0112571 A1 * | 4/2014 | Viera | G06Q 40/12 |
| | | | 382/138 |
| 2014/0184848 A1 * | 7/2014 | Shimosato | H04N 5/232939 |
| | | | 348/223.1 |
| 2014/0355865 A1 * | 12/2014 | Cantley | G06K 9/6201 |
| | | | 382/137 |
| 2015/0139492 A1 * | 5/2015 | Murakami | G06K 9/3241 |
| | | | 382/103 |
| 2015/0161765 A1 | 6/2015 | Kota et al. | |
| 2015/0186753 A1 * | 7/2015 | Horita | G06K 9/4638 |
| | | | 382/103 |
| 2016/0085564 A1 | 3/2016 | Arcese et al. | |
| 2016/0253573 A1 | 9/2016 | Eid et al. | |
| 2017/0011404 A1 | 1/2017 | Clower et al. | |
| 2017/0052944 A1 * | 2/2017 | Choudhry | G06F 16/93 |
| 2018/0096340 A1 | 4/2018 | Omojola et al. | |

OTHER PUBLICATIONS

Jul. 13, 2020—U.S. Notice of Allowance—U.S. Appl. No. 16/157,326.
Jun. 1, 2020—U.S. Notice of Allowance—U.S. Appl. No. 16/157,473.
Jun. 19, 2020—U.S. Notice of Allowance—U.S. Appl. No. 16/212,043.
Jun. 4, 2020—U.S. Non-Final Office Action—U.S. Appl. No. 16/211,963.

* cited by examiner

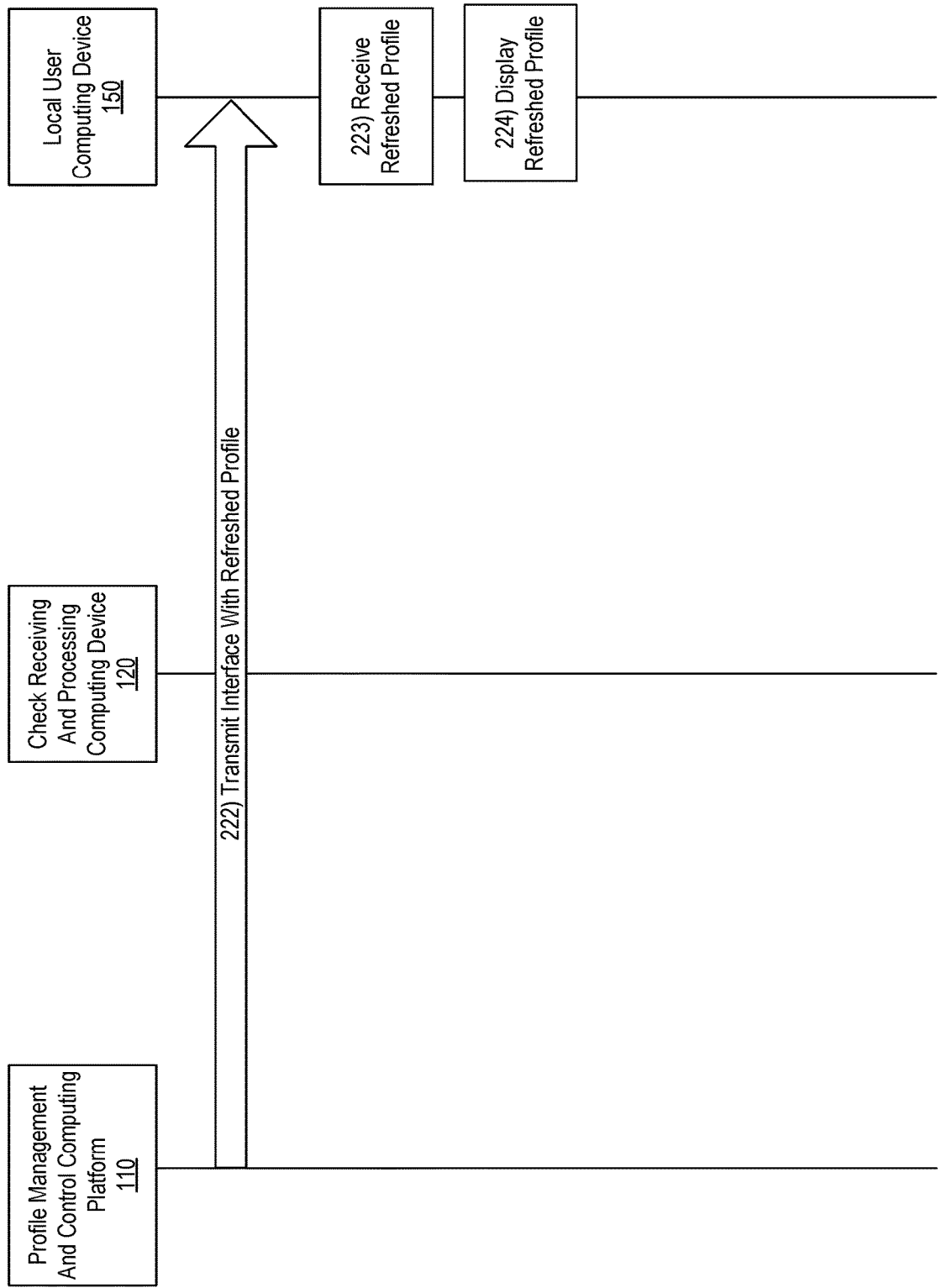

ENTERPRISE PROFILE MANAGEMENT AND CONTROL SYSTEM

CROSS REFERENCE TO RELATED APPLICATIONS

This application is related to U.S. application Ser. No. 16/157,276 filed Oct. 11, 2018, and entitled, "Item Validation and Image Evaluation System," U.S. application Ser. No. 16/157,326 filed Oct. 11, 2018, and entitled, "Image Evaluation and Dynamic Cropping System," and U.S. application Ser. No. 16/157,473 filed Oct. 11, 2018, and entitled, "Dynamic Profile Control System." All of which are incorporated herein by reference in their entirety

BACKGROUND

Aspects of the disclosure relate to electrical computers, systems, and machine learning. In particular, one or more aspects of the disclosure relate to profile management and control.

Thwarting unauthorized activity on one or more accounts is an important function. As unauthorized actors become more sophisticated, it can be difficult to identify unauthorized instruments. Further, even systems configured to identify unauthorized instruments can identify false positives. In some arrangements, an instrument or document being evaluated for validity may be compared to one or more other documents. However, if an insufficient number of documents is available for comparison, the results may be inaccurate. Accordingly, it would be advantageous to control a document profile to include a desired number and type of documents to improve accuracy of document analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

In some examples, a system, computing platform, or the like, may receive an instrument or image of an instrument. In some examples, the instrument may have been previously evaluated or processed to determine or attempt to determine validity and/or authenticity.

The instrument or image of the instrument may be received and profile management or control functions may be enabled. In some examples, data may be extracted from the instrument or image of the instrument and a document profile may be retrieved based on the extracted data. Images within the document profile may be evaluated to identify a type of document for each document. In some examples, a total number of documents of each type may be determined or identified. The total number of documents may be compared to a threshold.

In some examples, if the total number of documents is below the threshold, the documents or images in the profile may be maintained. If the total number of documents is at or above the threshold, in some examples, each document may be further evaluated to determine or identify documents or document images for deletion. In some arrangements, the profile may be refreshed and documents or images identified for deletion may be deleted.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for implementing profile management and control functions in accordance with one or more aspects described herein;

FIGS. 5A-5C illustrate example user interfaces including a document profile in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to profile management and control to improve accuracy in evaluating validity of documents.

As mentioned above, protecting user data and thwarting unauthorized activity is a priority for most users. In some examples, unauthorized actors may generate unauthorized or invalid checks or other instruments. Accordingly, in some examples, systems may evaluate the checks or other instruments or documents to determine validity and/or authenticity of the checks, instruments or other documents. However, because of the numerous different types of checks, check layouts, and the like, if an insufficient number of a similar type of check is available for comparison, the accuracy of the evaluation may be impacted.

Accordingly, aspects described herein are directed to systems for evaluating a document profile to determine whether a desired number of different types of documents are stored in the document profile. If not, the documents may be evaluated to identify one or more documents for deletion. In some examples, the profile may be refreshed and the documents identified for deletion may be deleted.

In some arrangements, the system may further evaluate recently received documents to determine whether the recently received document should be added to the profile. If so, the document may be added and the profile refreshed to include the newly added document.

These and various other arrangements will be discussed more fully below.

Figure 1A:
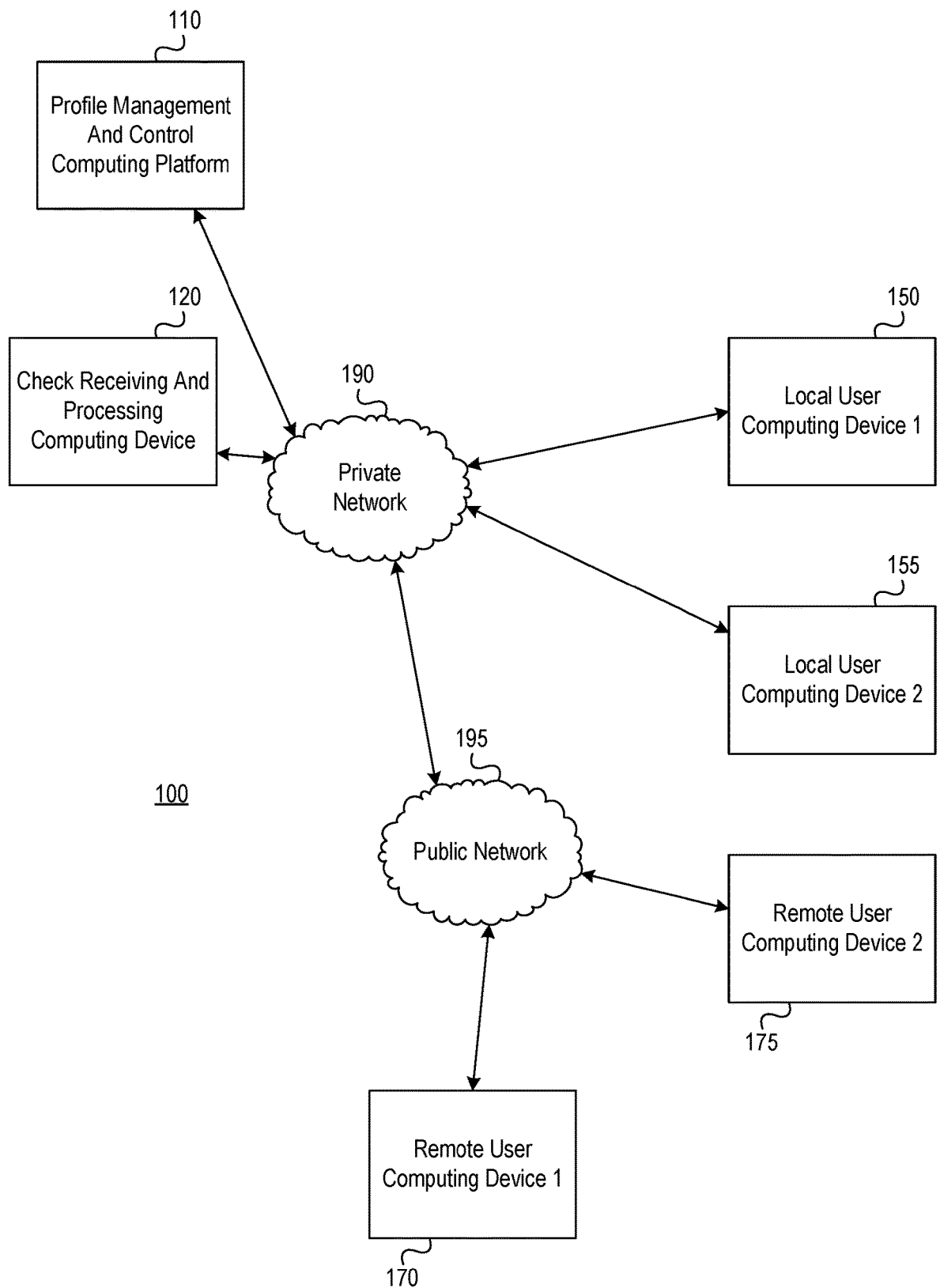
FIGS. 1A and 1B depict an illustrative computing environment for implementing profile management and control functions in accordance with one or more aspects described herein.
Figure 1B:
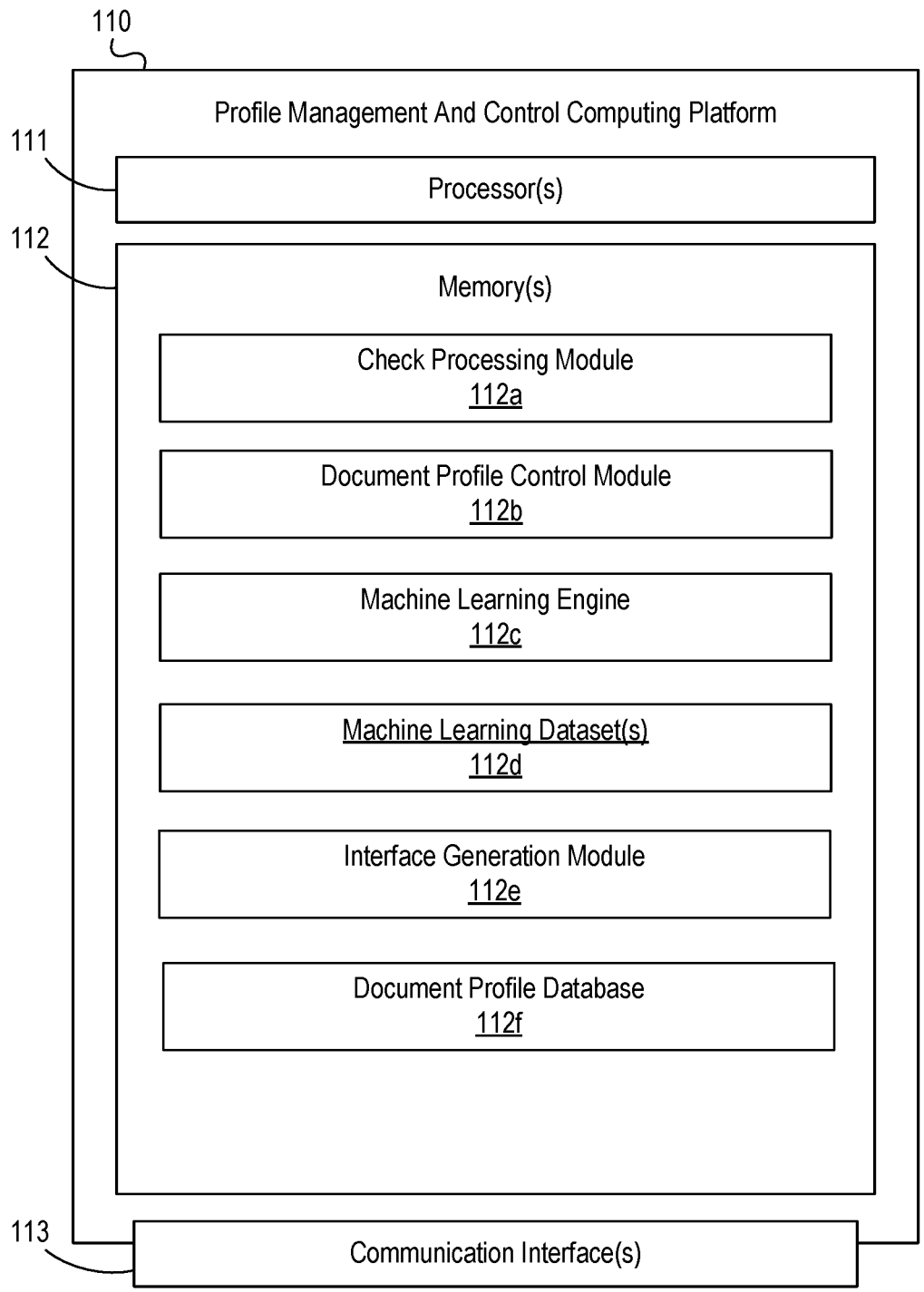

FIGS. 1A and 1B depict an illustrative computing environment for implementing and using a system for profile management and control in accordance with one or more aspects described herein. Referring to FIG. 1A, computing environment 100 may include one or more computing devices and/or other computing systems. For example, computing environment 100 may include profile management and control computing platform 110, a check receiving and processing computing device 120, a first local user computing device 150, a second local user computing device 155, a first remote user computing device 170, and a second remote user computing device 175.

Profile management and control computing platform 110 may be configured to host and/or execute a machine learning engine to provide intelligent, dynamic profile management and control functions with respect to checks or other instruments or documents. In some examples, one or more profile management and control functions may be initiated upon receiving a check that was evaluated for validity and/or authenticity. For instance, check receiving and processing computing device 120 may include one or more computing devices, servers, or the like, configured to receive checks or other instruments from a variety of sources. For instance, checks may be received via online or mobile banking applications executing on a user computing device, such as remote user computing device 170, 175, from an automated teller machine (ATM) or other self-service kiosk, from a banking associated within a financial institution location, or the like.

In some examples, the checks may be received by the check receiving and processing computing device 120 and may be processed, in real-time or near real-time, to evaluate the validity of the check or other instrument. In some examples, processing the check or other instrument may include comparing the check to one or more checks in a user profile associated with users drafting the checks (e.g., account holder, payer, or the like) and generating a score representing a likelihood that the check is fraudulent. For instance, the check receiving and processing computing device 120 may compare the received check to a plurality of checks in a document or check profile to evaluate various regions, fields or aspects of the check to determine whether the received check matches one or more checks in the profile. Based on a number of matching items, a score may be determined. For instance, if several regions, fields, or the like, match, a low score may be generated indicating that there is a low likelihood that the check is fraudulent. If few or no items match, a high score may be generated indicating that it is very likely that the check is fraudulent.

In some examples, the check receiving and processing computing device 120 may convert the check to a digital image or may store a digital image of the check (e.g., if received via electronic systems such as online or mobile banking applications). In some examples, this check image data, as well as the generated score, may be transmitted to the profile management and control computing platform 110.

In some arrangements, the check or document profile may include a plurality of different checks, check types, document types, or the like. However, as documents in the profile are deleted and new documents are added, the types of documents within the profile may become too homogenous. In order to accurately evaluate checks for validity and/or authenticity, having a variety of different types of checks, documents, or the like, may be advantageous (e.g., to improve accuracy, avoid false positives, and the like).

Accordingly, the profile management and control computing platform 110 may initiate management or control functions in order to assess the types of documents within the profile, identify documents for deletion, delete documents, add documents, and the like. For instance, the profile management and control computing platform 110 may execute one or more rules to evaluate each document within the profile to identify a type of document. For instance, the profile management and control computing platform 110 may evaluate each document to determine whether it is an actual check or image of an actual check written by the payer, whether it is a bill pay check generated by a system, and the like. Various other types of documents may be identified without departing from the invention.

In some examples, after identifying a type of document for each document within the profile, the profile management and control computing platform 110 may determine a total number of documents for each document type. That number may be compared to a threshold number (e.g., a desired number of checks or documents of a particular type). The threshold may be retrieved from a database, determined from one or more rules being executed, or the like.

If the number of documents of a particular type is below the threshold, the documents may be maintained in the profile. If the number of documents of a particular type is at or above the threshold, further evaluation of the checks or documents within the profile may be performed.

For instance, a date of each item of the particular document type may be evaluated to determine whether it is older than a threshold date. If so, the document may be deleted or removed from the profile. The profile may then be refreshed.

In some examples, one or more newly received checks or other documents may be added to the profile. For instance, if one or more checks or documents are deleted from a profile, checks or documents identified as valid or authentic and having a desired document type may be added to the profile and the profile may be refreshed.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the profile management and control computing platform 110 and/or the check receiving and processing computing device 120 to control parameters of the system, update rules, modify settings, and the like. Local user computing device 150, 155 may also include ATMs or other self-service kiosks, as well as banking associated computing devices, that may receive checks from a user and may transmit the check or check images for further processing.

The remote user computing devices 170, 175 may be used to communicate with, for example, profile management and control computing platform 110 and/or check receiving and processing computing device 120 to capture check image data, transmit check image data, and the like. For instance, remote user computing devices 170, 175 may include user computing devices, such as mobile devices including smartphones, tablets, laptop computers, and the like, that may be used to access and/or execute online banking applications, mobile banking applications, or the like.

In one or more arrangements, check receiving and processing computing device 120, local user computing device 150, local user computing device 155, remote user computing device 170, and/or remote user computing device 175 may be any type of computing device or combination of devices configured to perform the particular functions described herein. For example, check receiving and processing computing device 120, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of check receiving and processing computing device 120, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include profile management and control computing platform 110. As illustrated in greater detail below, profile management and control computing platform 110 may include one or more computing devices configured to perform one or more of the functions described herein. For example, profile management and control computing platform 110 may include one or more computers (e.g., laptop computers, desktop computers, servers, server blades, or the like).

As mentioned above, computing environment 100 also may include one or more networks, which may interconnect one or more of profile management and control computing platform 110, check receiving and processing computing device 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, profile management and control computing platform 110, check receiving and processing computing device 120, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect profile management and control computing platform 110, check receiving and processing computing device 120, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., profile management and control computing platform 110, check receiving and processing computing device 120, local user computing device 150, local user computing device 155) with one or more networks and/or computing devices that are not associated with the organization. For example, remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., profile management and control computing platform 110, check receiving and processing computing device 120, local user computing device 150, local user computing device 155).

Referring to FIG. 1B, profile management and control computing platform 110 may include one or more processors 111, memory 112, and communication interface 113. A data bus may interconnect processor(s) 111, memory 112, and communication interface 113. Communication interface 113 may be a network interface configured to support communication between profile management and control computing platform 110 and one or more networks (e.g., private network 190, public network 195, or the like). Memory 112 may include one or more program modules having instructions that when executed by processor(s) 111 cause profile management and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of profile management and control computing platform 110 and/or by different computing devices that may form and/or otherwise make up profile management and control computing platform 110.

For example, memory 112 may have, store, and/or include a check processing module 112a. Check processing module 112a may store instructions and/or data that may cause or enable the profile management and control computing platform 110 to receive one or more checks, check data, check image data, and the like, for further evaluation. In some examples, check processing module 112a may extract or parse data associated with the received check or data to identify a user, check or document profile associated with the payer of the check being evaluated. In some examples, data from the received check or check image may be used to identify a payer of a check. The identified payer may then be used to identify a check or document profile associated with the payer and stored in, for example, document profile database 112f. Document profile database 112f may store checks and/or check images, or other document images, associated with a payer.

Profile management and control computing platform 110 may further have, store and/or include document profile control module 112b. Document profile control module 112b may store instructions and/or data that may cause or enable the profile management and control computing platform 110 to retrieve a check or document profile (e.g., from document profile database 1120 based on information extracted from a received check or document. Document profile control module 112b may further analyze the profile and documents or images within the profile to determine whether the profile includes a desired number of documents of particular document types. For instance, the document profile control module 112b may evaluate each document or image in the profile to determine a document type. The document profile control module 112b may determine a total number of documents of each document type and may compare the number to a threshold. If the number is below the threshold, the profile may be maintained. If the number is at or above a threshold, each document or image may be further evaluated to determine whether it meets criteria for deletion. For instance, if a date of the document or image is later than a threshold date, the document or image may be deleted from the profile. Document profile control module 112b may further refresh the profile and/or may evaluate newly received checks or documents to determine whether they should be added to the profile, may add checks or documents to the profile, and the like.

In some examples, evaluating a number of checks or documents of a particular type, identifying a desired number of documents or checks of a particular type for a profile, determining whether a check or document should be deleted, and/or determining whether a check or document should be added to a profile may be performed using machine learning. For instance, profile management and control computing platform 110 may further have, store and/or include a machine learning engine 112c and machine learning datasets 112d. Machine learning engine 112c and machine learning datasets 112d may store instructions and/or data that may cause or enable profile management and control computing platform 110 to evaluate a check or document profile, evaluate images or documents within the profile, evaluate checks or documents received to be considered for addition to the profile, and the like. The machine learning datasets 112d may be generated based on analyzed data (e.g., data from previously received data, previously analyzed checks, and the like), raw data, and/or received from one or more outside sources.

The machine learning engine 112c may receive check images and/or data and/or profile data and, using one or more machine learning algorithms, may generate one or more machine learning datasets 112d. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

In some examples, the machine learning datasets 112d may include machine learning data linking one or more one or more check or document types to increased accuracy in determining validity of checks. For instance, the machine learning datasets 112d may include machine learning data linking check attributes, profile attributes, or the like, to accurately evaluating checks, check images, or other documents for validity and/or authenticity. The machine learning datasets 112d may be updated and/or validated based on subsequent data received, for example, after a check has been evaluated for validity, added to a profile, deleted from a profile, or the like.

Profile management and control computing platform 110 may further have, store and/or include an interface generation module 112e. Interface generation module 112e may include instructions and/or data that may cause or enable the profile management and control computing platform 110 to generate one or more user interfaces displaying one or more check or document images in a profile. In some examples, the interfaces may be refreshed or regenerated based on deletion of data, addition of data, and the like.

The profile management and control computing platform 110 may further have, store and/or include document profile database 112f. Document profile database 112f may store check or other document profiles and associated information, such as name of a payer, account information, contact information, or the like. The checks, check images or other documents in a document profile may correspond to a plurality of previously processed checks or other instruments that, in at least some examples, were determined to be valid.

FIGS. 2A-2E depict an illustrative event sequence for implementing and using profile management and control functions in accordance with one or more aspects described herein. The events shown in the illustrative event sequence are merely one example sequence and additional events may be added, or events may be omitted, without departing from the invention.

Figure 2A:
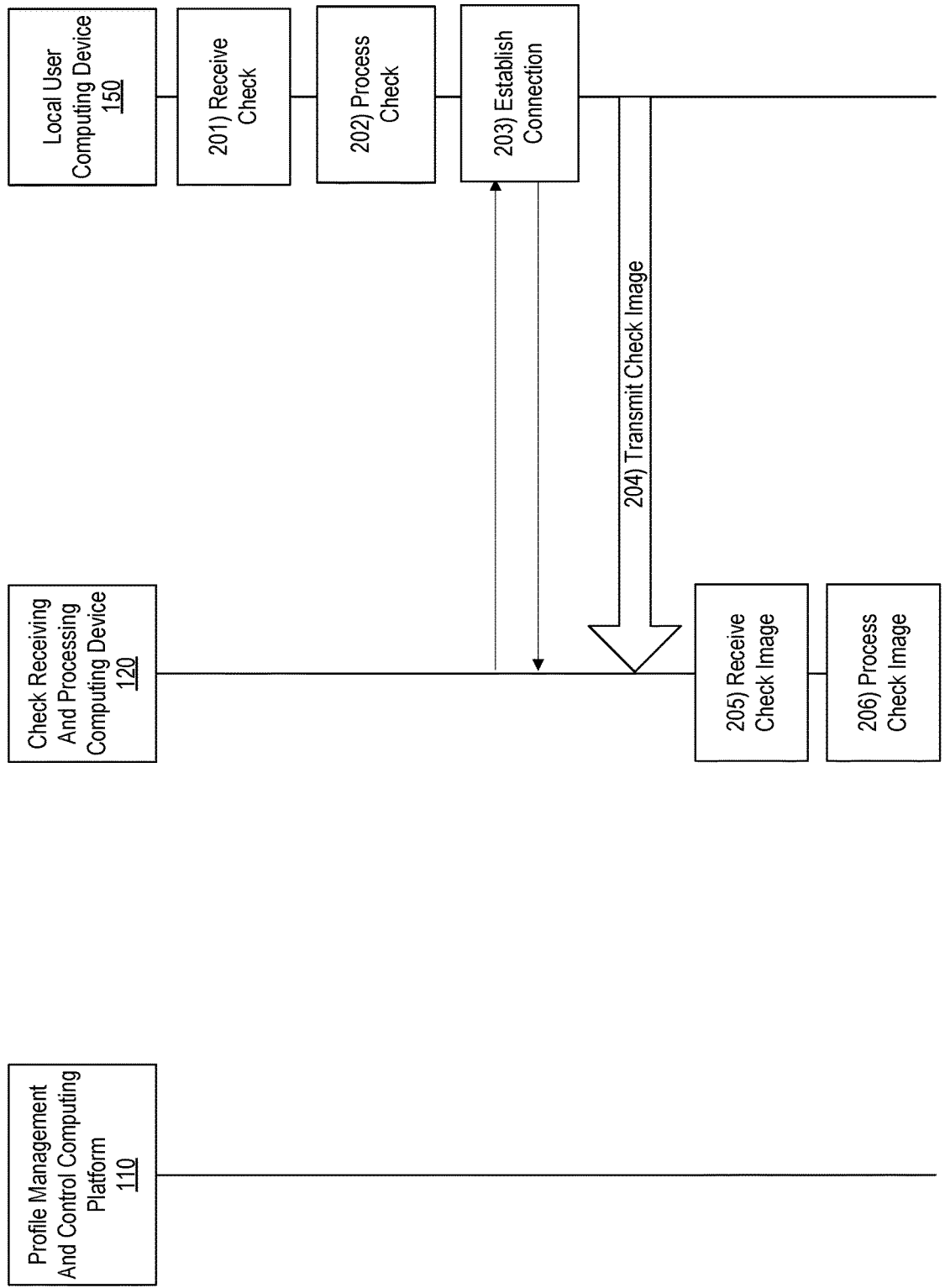

Referring to FIG. 2A, at step 201, a check may be received by a device. For instance, a check or other instrument may be received by local user computing device 150. As discussed herein, local user computing device 150 may include an ATM or other self-service kiosk, a banking associate computing device, or the like. Although the event sequence shown and described includes receiving a check by a local user computing device 150, in some examples, the check may be received by a remote user computing device 170 (e.g., via mobile or online banking applications) without departing from the invention.

At step 202, preliminary processing of the check may be performed. For instance, the check may be converted to a digital image. Additionally or alternatively, the check image may be stored by the local user computing device 150, transmitted to another device for storage or the like.

At step 203, a connection may be established between the local user computing device 150 and the check receiving and processing computing device 120. For instance, a first wireless connection may be established between the local user computing device 150 and the check receiving and processing computing device 120. Upon establishing the first wireless connection, a communication session may be initiated between the check receiving and processing computing device 120 and the local user computing device 150.

At step 204, the check or check image may be transmitted from the local user computing device 150 to the check receiving and processing computing device 120. For instance, the check image may be transmitted during the communication session initiated upon establishing the first wireless connection.

At step 205, the check or check image may be received by the check receiving and processing computing device 120. At step 206, the check or check image may be processed by the check receiving and processing computing device 120. For instance, the check receiving and processing computing device 120 evaluate the check for validity and/or authenticity. In some examples, the evaluation may be performed by comparing the received check or check image to one or more checks or check images in a document profile.

Figure 2B:
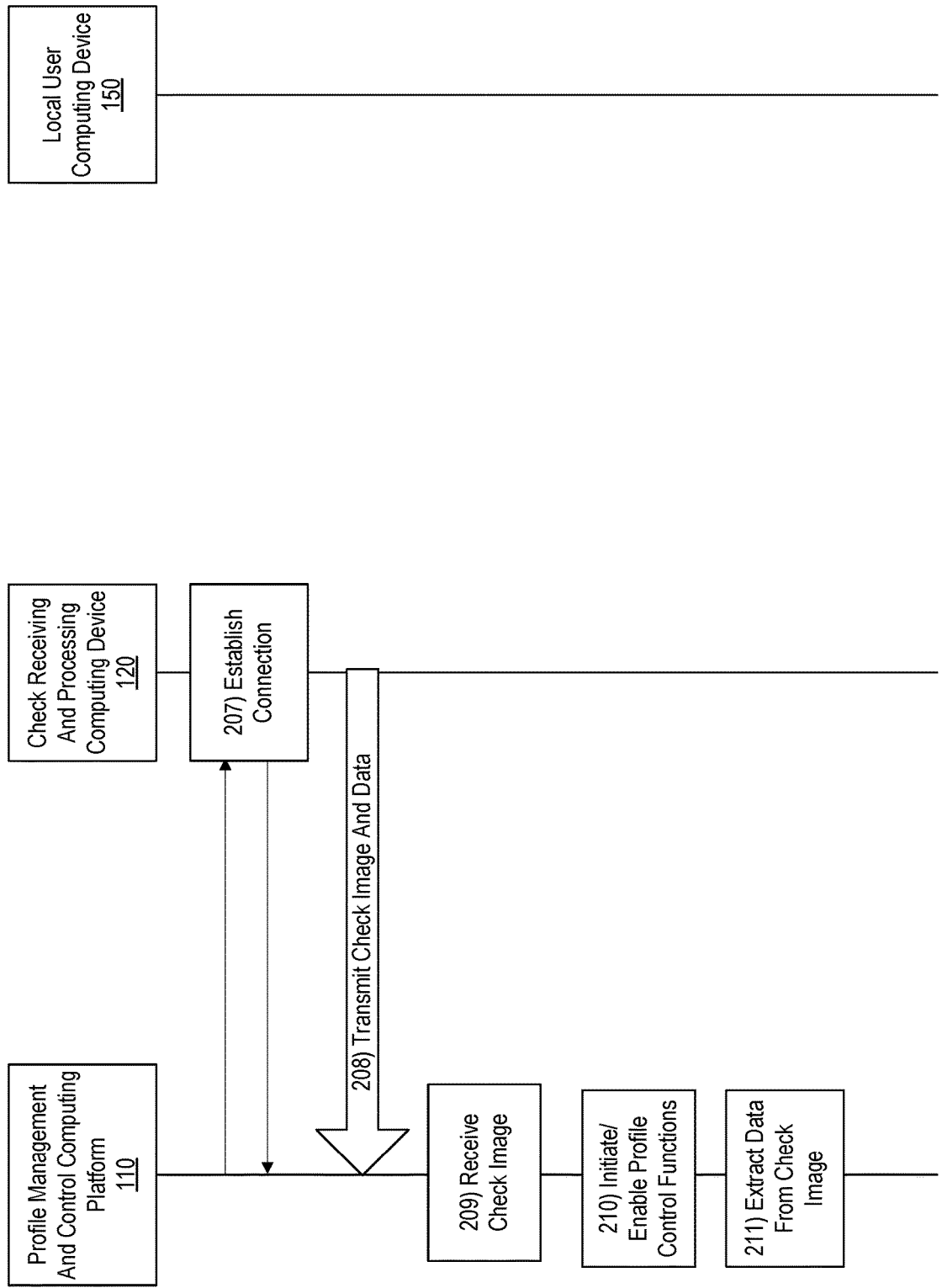

With reference to FIG. 2B, at step 207, a connection may be established between the check receiving and processing computing device 120 and the profile management and control computing platform 110. For instance, a second wireless connection may be established between the check receiving and processing computing device 120 and the profile management and control computing platform 110. Upon establishing the second wireless connection, a communication session may be initiated between the check receiving and processing computing device 120 and the profile management and control computing platform 110.

At step 208, the check image may be transmitted from the check receiving and processing computing device 120 to the profile management and control computing platform 110. For instance, the check image may be transmitted during the communication session initiated upon establishing the second wireless connection. In some examples, the check image may include associated data, such as a validity or authenticity of the check or check image, a validity score of the check or check image, or the like.

At step 209, the check image may be received by the profile management and control computing platform 110. At step 210, one or more profile control functions may be initiated, activated, and/or enabled. For instance, one or more profile control functions that was disabled may be enabled in order to perform profile control functions.

At step 211, data may be extracted from the check image. For instance, data related to a user, payer, account, or the like, associated with the check or check image may be extracted from the received check image.

Figure 2C:
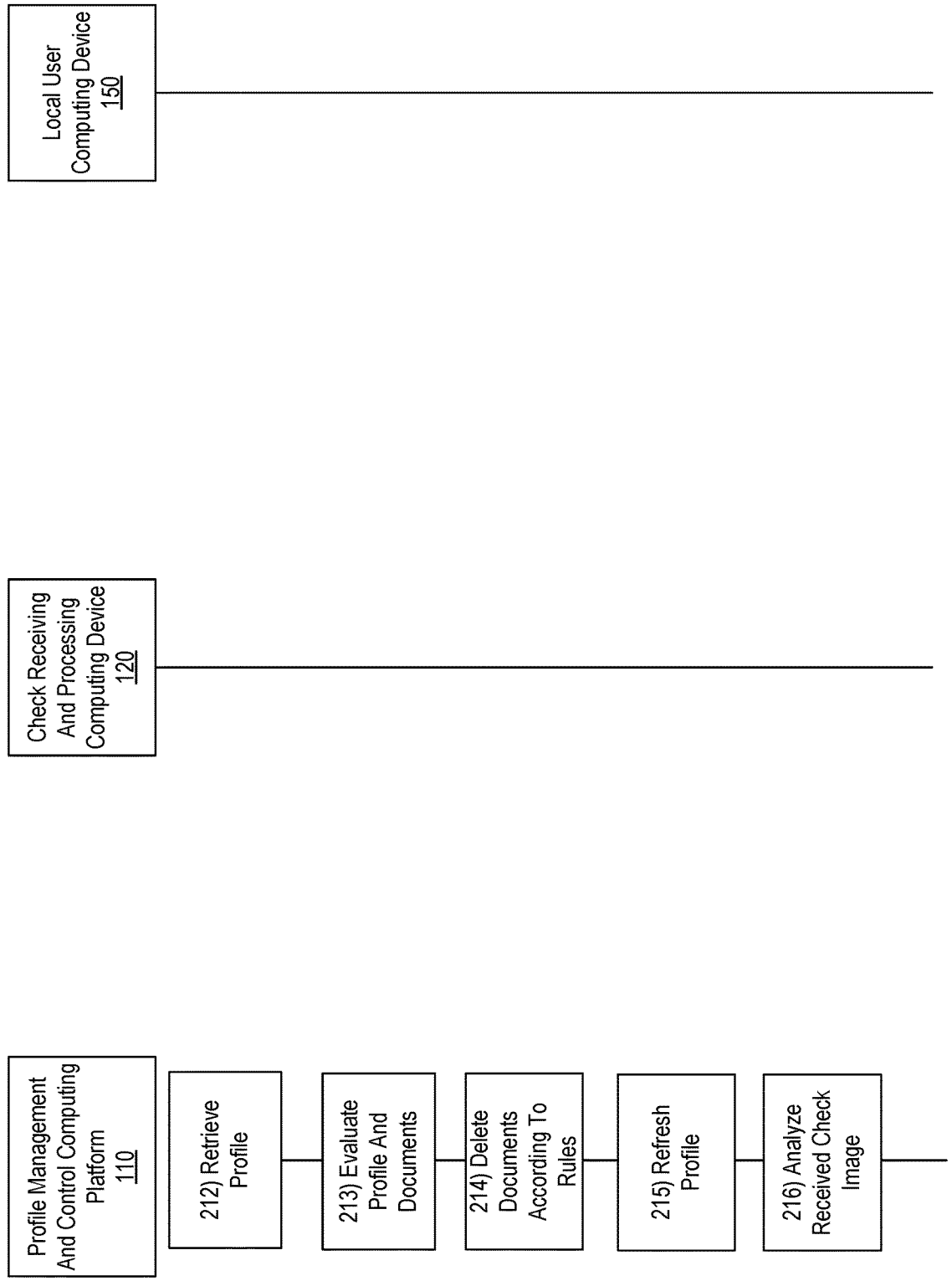

With reference to FIG. 2C, at step 212, a profile may be retrieved. For instance, a profile may be retrieved from, for example, a document profile database, based on the data extracted from the check image. For example, the extracted data may be used as input into a search query to identify a profile and retrieve the profile.

At step 213, the profile and documents or images within the profile may be analyzed or evaluated. For instance, each document within the retrieved profile may be analyzed to determine a type of document. For example, each document may be analyzed to determine a type of check, such as a bill pay check, physical check written by the payer, or the like. Various other types of documents or document types may also be identified.

In some examples, a total number of documents of each document type may be determined and may be compared to a document type threshold. If the total number of documents of a type is at or above the threshold, one or more documents may be deleted according to rules executed by the profile management and control computing platform 110. For instance, each document of the type that is at or above the threshold may be further evaluated to determine a date of the document. In some examples, one or more documents having an oldest date may be deleted. In another example, each date may be compared to a threshold date and any documents older than the threshold date may be deleted. In yet another example, a validity score associated with each document of the type that is at or above the threshold may be compared to a threshold and any documents with a validity score above the threshold (or vice versa as desired) may be deleted.

If the number of documents of a document type is below the threshold, the documents in the profile may be maintained.

At step 215, the profile may be refreshed. For instance, the documents stored in the profile that were flagged for deletion based on one or more executed rules may be deleted and the refreshed profile may include only the documents or images associated with documents not flagged for deletion.

At step 216, the received check image may be analyzed. For instance, a type of document of the received check image may be identified, a date of the check image may be identified, and the like.

Figure 2D:
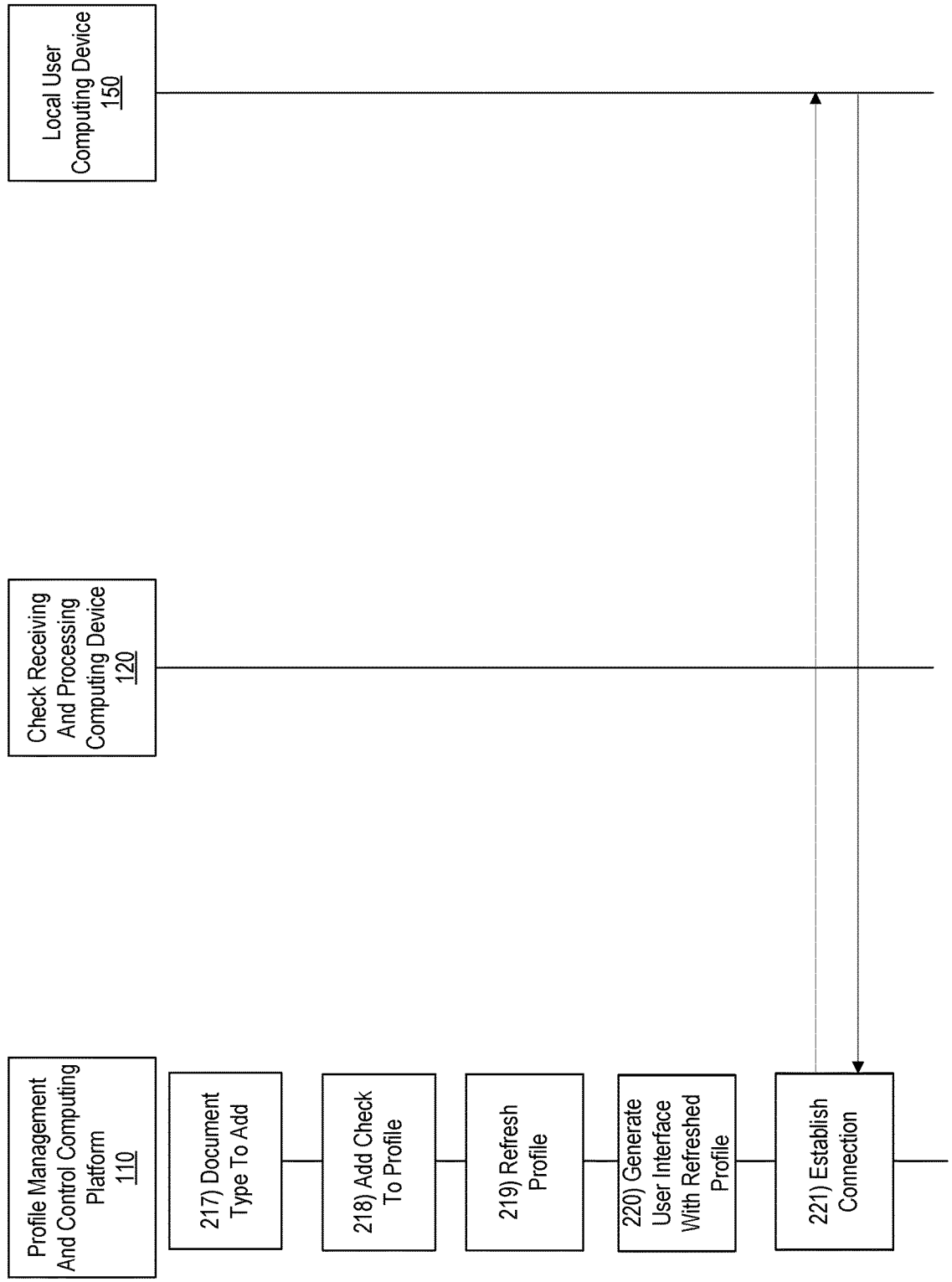

With reference to FIG. 2D, a determination may be made as to whether the document type of the received check is a type of document to add. For instance, the total number of documents in a profile may be evaluated to determine a desired number of each type of document to maintain in the profile (e.g., to provide the desired number of documents for comparison). If additional documents of a particular type should be added, incoming checks or other documents may be evaluated to be added. For example, the document type of the received check may be compared to document types to be added. If a match occurs, the received check may be added to the profile in step 218.

At step 219, the profile may be refreshed. For instance, newly added checks, check images, or other documents may be added to the profile and stored in the profile when the profile is refreshed.

At step 220, a user interface may be generated. In some examples, the user interface may include the refreshed profile and may include a display of one or more checks, check images, or other documents in the profile.

At step 221, a connection may be established between the profile management and control computing platform 110 and local user computing device 150. For instance, a third wireless connection may be established between the profile management and control computing platform 110 and the local user computing device 150. Upon establishing the third wireless connection, a communication session may be initiated between the profile management and control computing platform 110 and the local user computing device 150.

With reference to FIG. 2E, at step 222, the user interface including the refreshed profile may be transmitted from the profile management and control computing platform 110 to the local user computing device 150. For instance, the user interface may be transmitted during the communication initiated upon establishing the third wireless connection.

At step 223, the user interface including the refreshed profile may be received by the local user computing device 150. At step 224, the local user computing device 150 may display the user interface including the refreshed profile on a display of the local user computing device 150.

Figure 3:
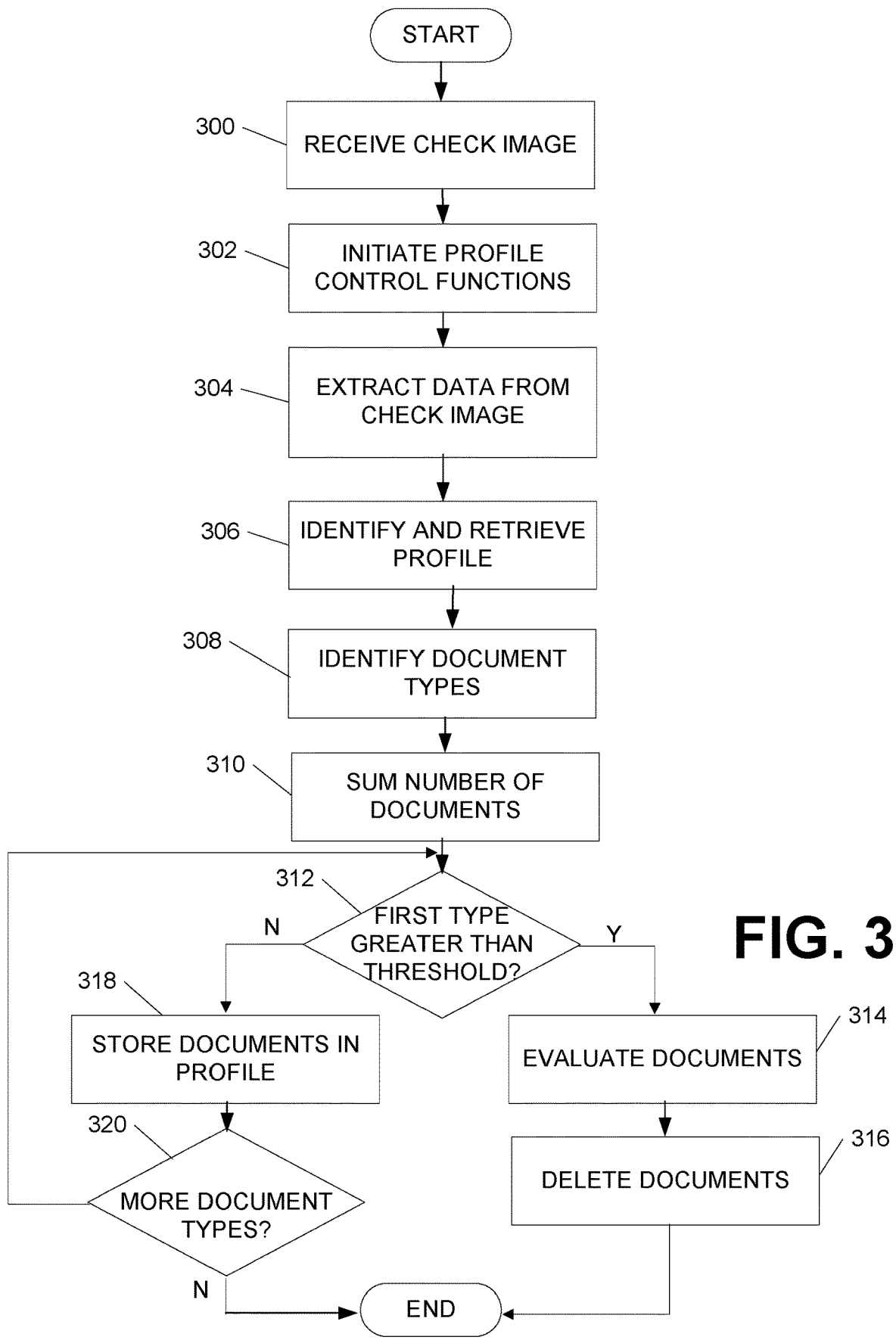
FIG. 3 depicts an illustrative method for implementing and using a system to perform profile management and control functions, according to one or more aspects described herein.

FIG. 3 is a flow chart illustrating one example method of providing profile management and control functions according to one or more aspects described herein. The processes illustrated in FIG. 3 are merely some example processes and functions. The steps shown may be performed in a different order, more steps may be added, or one or more steps may be omitted without departing from the invention.

At step 300, a check image may be received by the profile management and control computing platform 110. In some examples, the check may have been previously processed by the check receiving and processing computing device 120 and a validity may be determined or attempted to be determined. In other examples, the check image may be received from a computing device receiving the check for processing, such as local user computing device 150, remote user computing device 170, or the like.

At step 302, one or more profile control functions may be enabled, activated or initiated. For instance, one or more profile control functions previously disabled may be enabled in response to receiving the check or check image.

At step 304, data may be extracted from the check image. For instance, a user, account, payer, or the like, may be extracted from the check image. At step 306, the extracted data may be used to query a database to identify a document profile and retrieve the document profile.

At step 308, each document within the document profile may be evaluated to determine a document type of each document or image. At step 310, a total number of documents of each type may be determined (e.g., by summing the number of documents of each type).

At step 312, a determination may be made as to whether a total number of documents of a first type meets or exceeds a threshold number. If so, at step 314, each document of the first type may be evaluated to determine whether it should be flagged for deletion. For instance, a date of the document may be compared to a threshold date, dates of other documents, or the like, to determine whether the document meets criteria for deletion. At step 316, the profile may be refreshed and the documents identified for deletion may be deleted or removed from the profile.

If, at step 312, the total number of documents of the first type does not meet or exceed the threshold number, the documents of that type may continue to be stored in the profile at step 318.

At step 320, a determination may be made as to whether there are additional types of documents to be evaluated. If so, the process may return to step 312. If not, the process may end.

Figure 4:
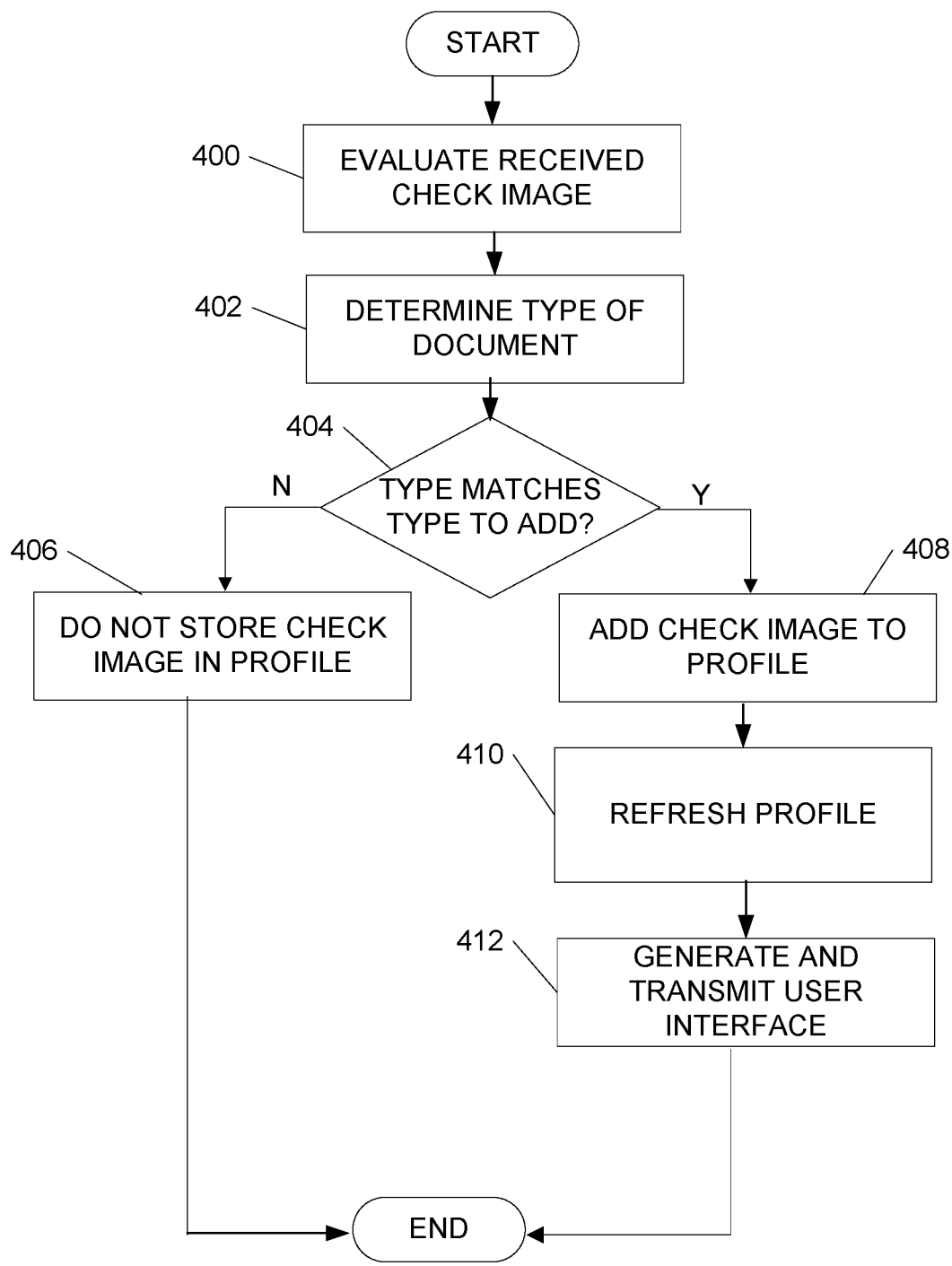
FIG. 4 depicts another illustrative method for implementing and using a system to perform profile management and control functions, according to one or more aspects described herein.

FIG. 4 is a flow chart illustrating another example method of providing profile management and control functions according to one or more aspects described herein. The processes illustrated in FIG. 4 are merely some example processes and functions. The steps shown may be performed in a different order, more steps may be added, or one or more steps may be omitted without departing from the invention In some examples, the processes described with respect to FIG. 4 may be performed after an evaluation of the profile as described with respect to FIG. 3.

At step 400, the received check image may be evaluated. For instance, the check image received at step 300 may be further evaluated to determine whether it should be added to the profile. In some examples, date information, payer information, payee information, and the like, may be identified.

At step 402, a type of document of the received check image may be determined. At step 404, a determination may be made as to whether the determined type of document matches a type of document to be added to a profile. For instance, after documents have been deleted from a profile, the profile management and control computing platform 110 may identify one or more types of documents to store in the profile to provide a more varied array of type of documents. Having a plurality of different types of documents, and a plurality of documents of a particular type, may provide increased accuracy in evaluating validity and/or authenticity of checks or other documents that will be subsequently evaluated by comparison with the documents in the profile.

If, at step 404, the type of document matches a type to be added, the check image may be added to the profile at step 408. At step 410, the profile may be refreshed to include the newly stored check image. At step 412, a user interface including the refreshed profile may be generated and transmitted for display.

If, at step 404, the type of document does not match a type to be added, the received check image might not be stored in the profile at step 406 (e.g., the system may prevent storage of the check image in the profile) and the process may end.

Figure 5A:
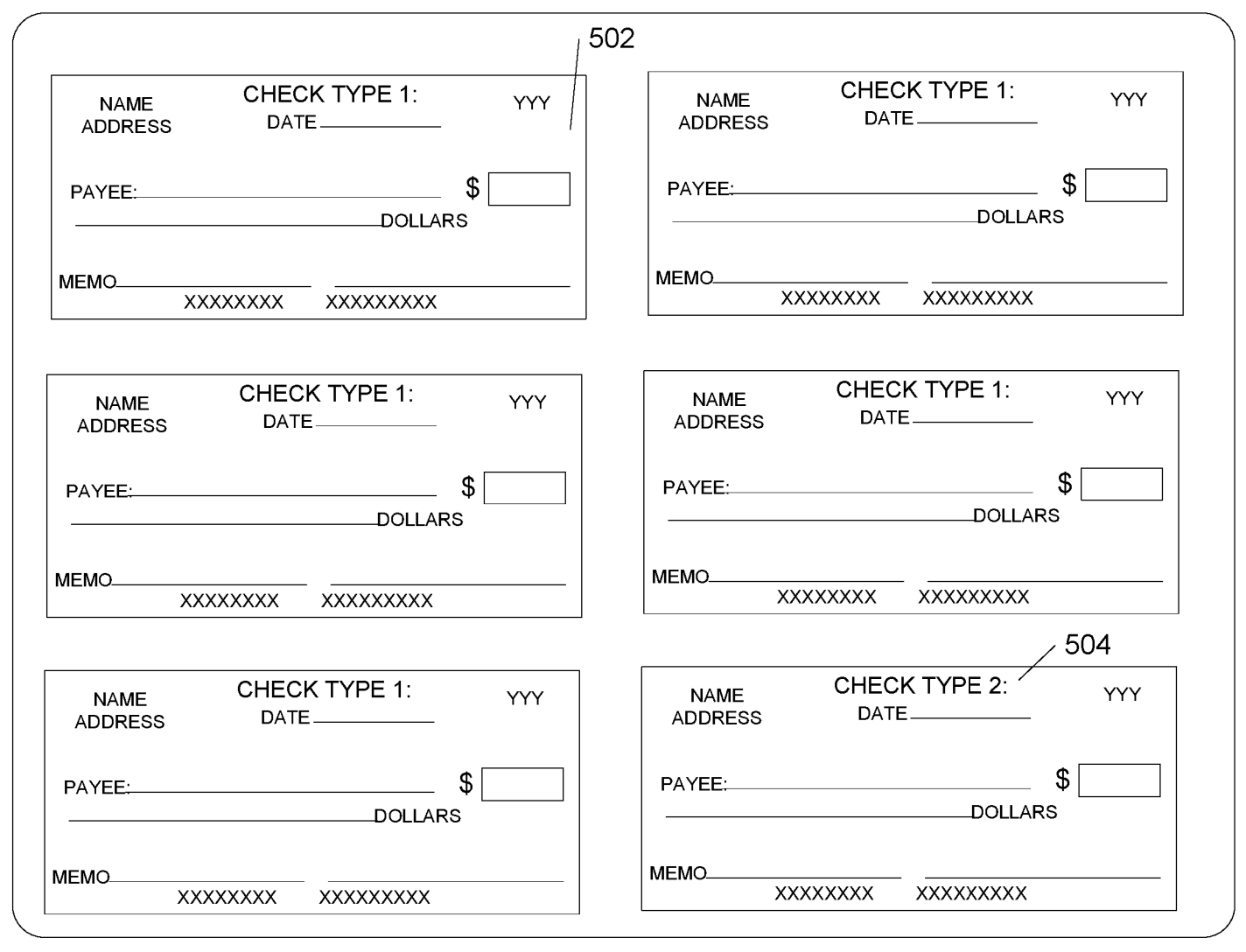
Figure 5B:
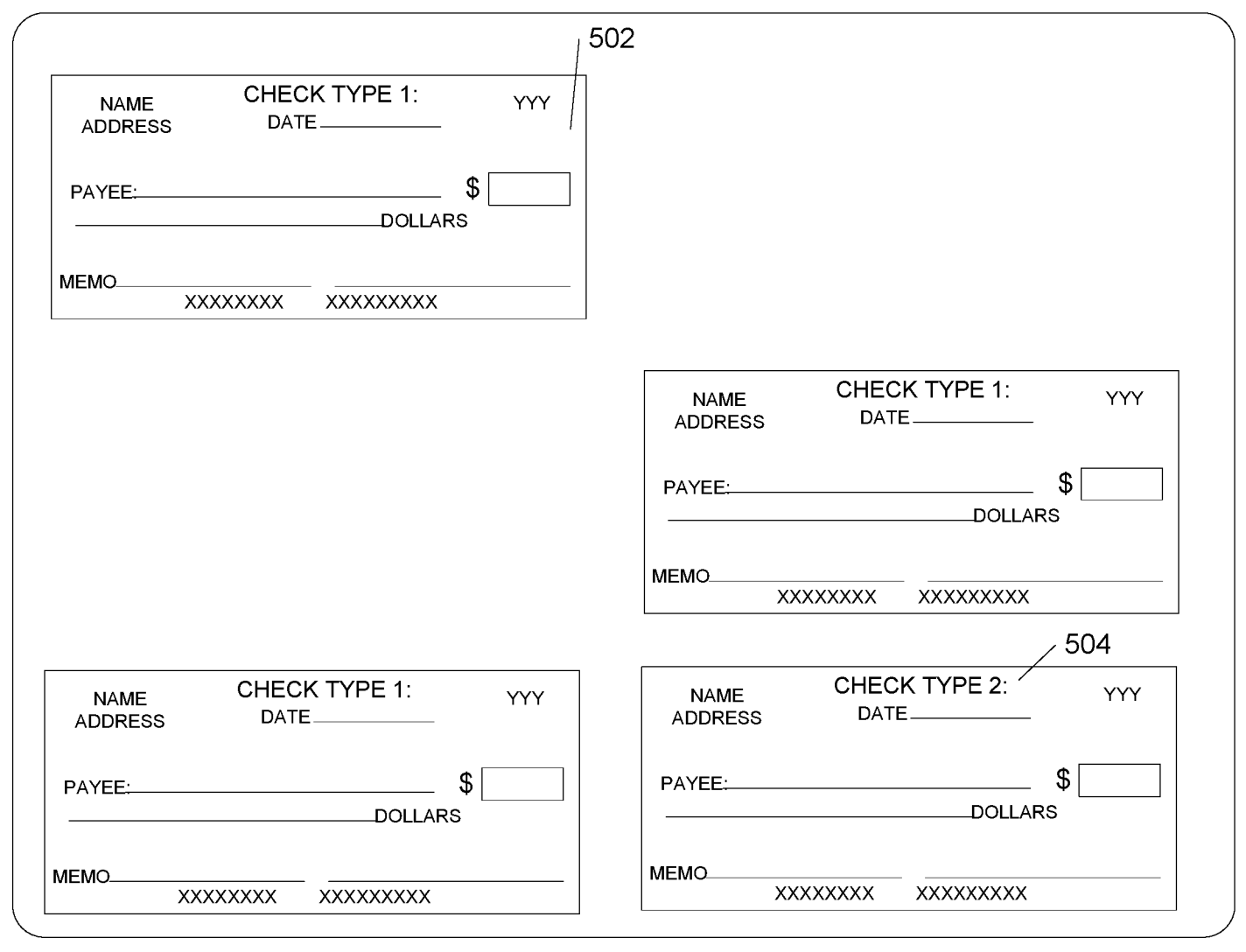
Figure 5C:
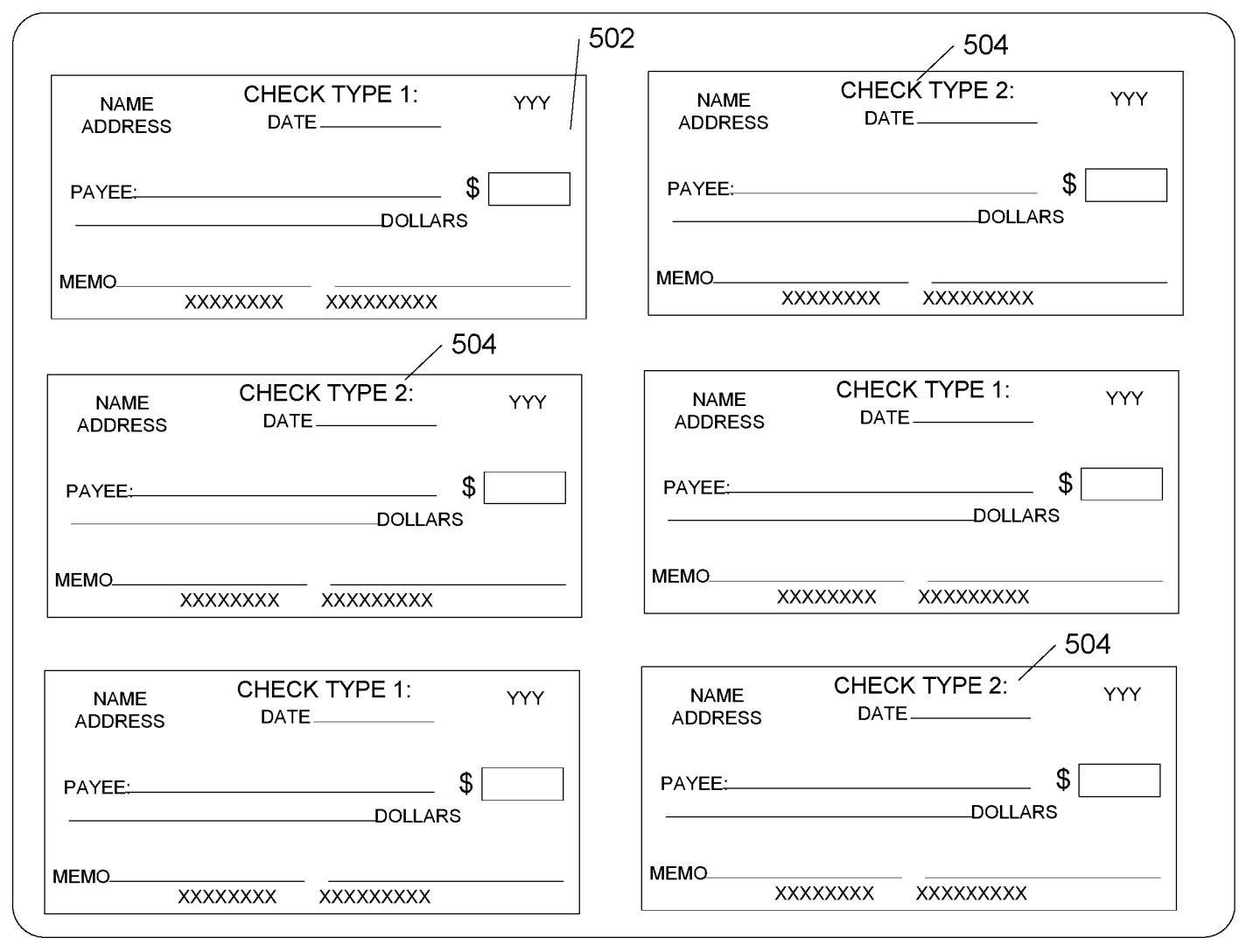

FIGS. 5A-5C illustrate example user interfaces including a profile and associated check or document images according to one or more aspects discussed herein.

With reference to FIG. 5A, a user interface including a document profile is provided. As shown in FIG. 5A, the user interface includes a plurality of check images. The plurality of check images may include images of different types of checks. For instance, the interface shown includes 5 check images of check type 1 502, and one check image of check type 2 504. Because having a plurality of different types of documents and a plurality of documents of each type improves accuracy in evaluating validity and authenticity of subsequent checks or documents being evaluated, the system may determine that one or more checks of check type 1 should be deleted. For instance, as discussed herein, the checks in the profile may be evaluated to determine a type, a total number of checks of each type may be determined and compared to a threshold. If above the threshold, one or more documents may be further evaluated for possible deletion.

FIG. 5B illustrates another user interface including the profile but with one or more checks of check type 1 502 deleted. Accordingly, after identifying checks for deletion, the profile may be refreshed and a user interface including the remaining checks in the profile (e.g., not including the checks deleted) may be generated and displayed.

After checks have been deleted, the system may evaluate one or more incoming checks for potential inclusion in the profile. As discussed herein, a type of document of one or more incoming check may be identified and compared to a type of document to be added to the profile. If a match exists, the check image may be added to the profile and the profile may be refreshed.

Accordingly, FIG. 5C includes a user interface including the refreshed profile including three checks of check type 1 502 and three checks of check type 2 504. Accordingly, checks subsequently evaluated for validity and/or authenticity may be more accurately evaluated because the profile includes a greater variety of different types of documents.

As discussed herein, aspects described are directed to systems for managing and controlling a document profile and/or the contents thereof. By evaluating the types and number of documents of each type within a profile, the system may ensure that a desired mix of different types of documents are stored within the profile and are available for use in evaluating validity and/or authenticity of subsequently received and/or evaluated documents.

In some examples, the profile management and/or control functions may be performed in real-time or near real-time. Accordingly, as a check or other document is received, the system may, in real-time, evaluate the make-up of the profile to determine whether a desired mix of documents is present.

In some examples, one or more rules or rule sets may be used to determine what is stored in a profile. Accordingly, by evaluating the make-up of the profile, and controlling or managing the profile, one or more rule sets may be updated to provide a more diverse array of documents or checks.

In some arrangements, a system may execute rules to delete and add checks on a periodic basis. For instance, every one month, three months, or the like, old checks may be deleted and new checks may be uploaded to the profile. However, this can result in an undesirable mix of checks. Accordingly, the arrangements provided herein may be executed on a real-time basis to evaluate the mix of checks and modify or control the profile as desired.

Further, the arrangements described herein may be used to identify a new pattern of check associated with a user. For instance, if a user is using a different service to print a check, the pattern of the check may change. This may result in a false positive in determining whether the check is invalid. Accordingly, the arrangements described herein may permit the system to evaluate the check and check pattern and add the check or check pattern to the profile, as desired.

The above-described examples and arrangements are merely some example arrangements in which the systems described herein may be used. Various other arrangements employing aspects described herein may be used without departing from the invention.

Figure 6:
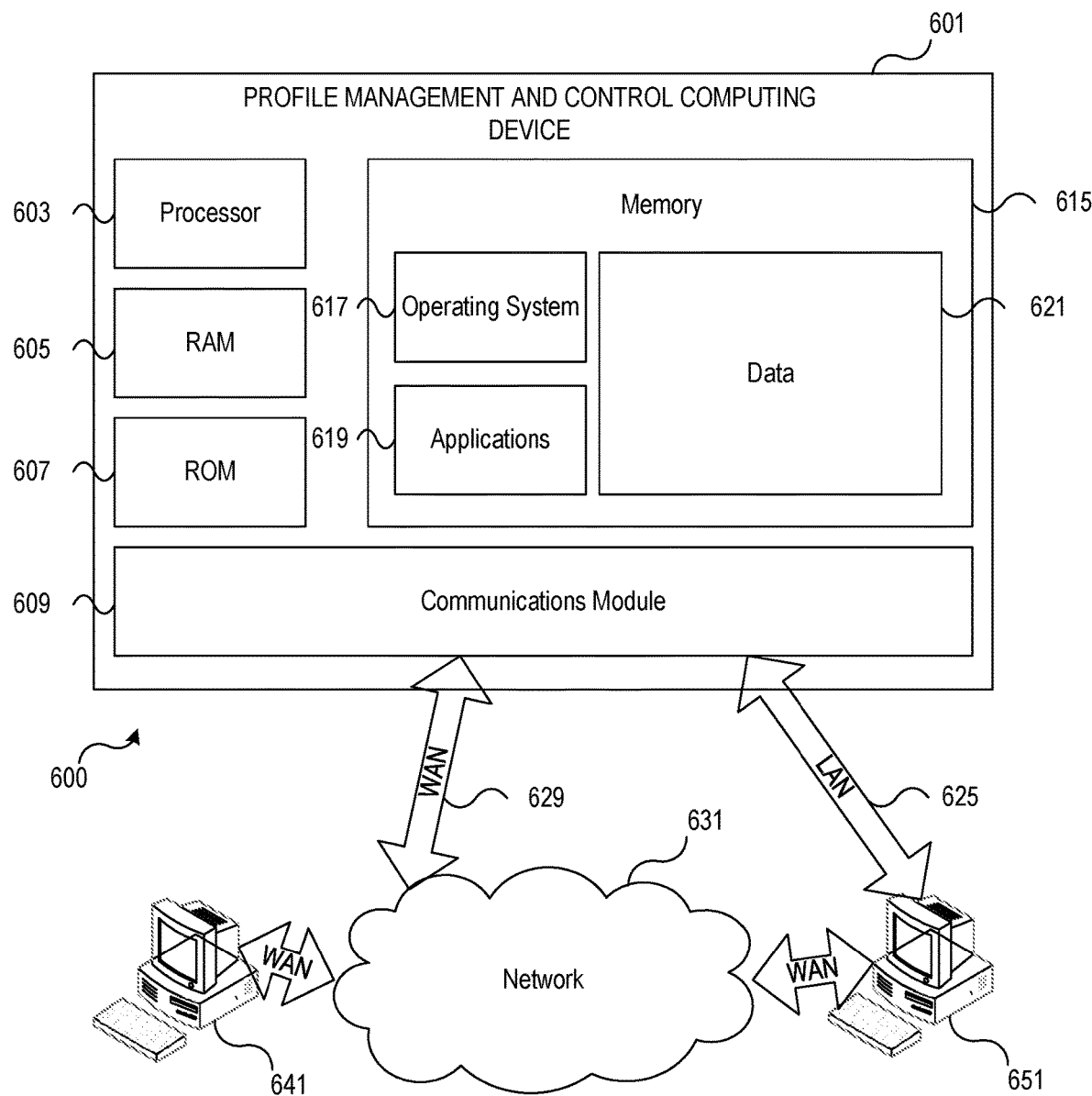
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include profile management and control computing device 601 having processor 603 for controlling overall operation of profile management and control computing device 601 and its associated components, including Random Access Memory (RAM) 605, Read-Only Memory (ROM) 607, communications module 609, and memory 615. Profile management and control computing device 601 may include a variety of computer readable media. Computer readable media may be any available media that may be accessed by profile management and control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on profile management and control computing device 601. Such a processor may execute computer-executable instructions stored on a computer-readable medium.

Software may be stored within memory 615 and/or storage to provide instructions to processor 603 for enabling profile management and control computing device 601 to perform various functions as discussed herein. For example, memory 615 may store software used by profile management and control computing device 601, such as operating system 617, application programs 619, and associated database 621. Also, some or all of the computer executable instructions for profile management and control computing device 601 may be embodied in hardware or firmware. Although not shown, RAM 605 may include one or more applications representing the application data stored in RAM 605 while profile management and control computing device 601 is on and corresponding software applications (e.g., software tasks) are running on profile management and control computing device 601.

Communications module 609 may include a microphone, keypad, touch screen, and/or stylus through which a user of profile management and control computing device 601 may provide input, and may also include one or more of a speaker for providing audio output and a video display device for providing textual, audiovisual and/or graphical output. Computing system environment 600 may also include optical scanners (not shown).

Profile management and control computing device 601 may operate in a networked environment supporting connections to one or more remote computing devices, such as computing devices 641 and 651. Computing devices 641 and 651 may be personal computing devices or servers that include any or all of the elements described above relative to profile management and control computing device 601.

The network connections depicted in FIG. 6 may include Local Area Network (LAN) 625 and Wide Area Network (WAN) 629, as well as other networks. When used in a LAN networking environment, profile management and control computing device 601 may be connected to LAN 625 through a network interface or adapter in communications module 609. When used in a WAN networking environment, profile management and control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
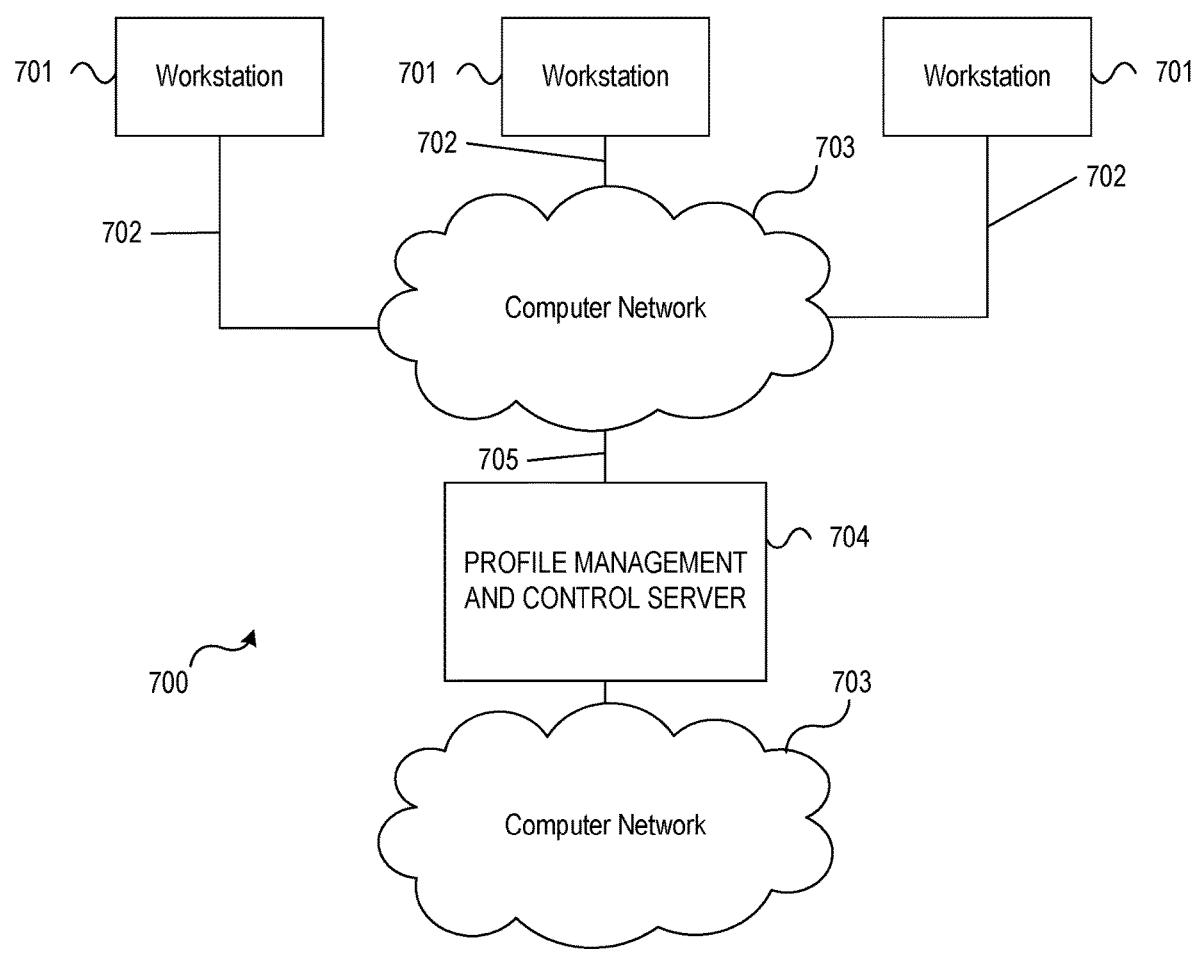
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to profile management and control server 704. In system 700, profile management and control server 704 may be a server, processor, computer, or data processing device, or combination of the same, configured to perform the functions and/or processes described herein. Server 704 may be used to receive check images, extract data from check images, retrieve a profile, evaluate documents within a profile, delete documents from a profile, add documents to a profile, refresh a profile, generate a user interface, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and profile management and control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   retrieve, from a user profile database, a document profile associated with a user and including images of a plurality of checks associated with the user, each check of the plurality of checks having a check type;
   evaluate each image retrieved from the profile database to identify the check type for each check;
   determine, based on the identified check type, a number of checks of each check type in the document profile;

compare a number of checks of a first check type to a threshold number;

responsive to determining that the number of checks of the first check type is below the threshold number, store the images in the document profile;

responsive to determining that the number of checks of the first check type is above the threshold number:

further evaluate each check of the first check type to identify one or more checks for deletion;

refresh the document profile including deleting the identified one or more checks for deletion; and generate a user interface including the refreshed document profile.

2. The computing platform of claim 1, wherein further evaluating each check of the first check type to identify one or more checks for deletion further includes:

identifying a date associated with each check of the first check type;

comparing the date associated with each check of the first check type to a threshold date;

responsive to determining that a date of a check is earlier than the threshold date, identifying the check for deletion; and responsive to determining that the date of the check is later than the threshold date, storing the check.

3. The computing platform of claim 1, wherein further evaluating each check of the first check type to identify one or more checks for deletion further includes:

identifying a date associated with each check of the first check type;

identifying a check of the first check type having an oldest date; and identifying the check of the first check type having the oldest date for deletion.

4. The computing platform of claim 1, further including instructions that, when executed, cause the computing platform to:

prior to retrieving the document profile:
receive a check image;
extract data from the check image; and
retrieve the document profile based, at least in part, on the extracted data.

5. The computing platform of claim 4, wherein the extracted data includes a payer associated with the check image.

6. The computing platform of claim 1, further including instructions that, when executed, cause the computing platform to:

prior to retrieving the document profile:
receive a check image; and
enable profile control functions responsive to receiving the check image.

7. The computing platform of claim 1, wherein the plurality of checks includes a plurality of checks images.

8. A method, comprising:

at a computing platform comprising at least one processor, memory, and a communication interface:

retrieving, by the at least one processor and from a user profile database, a document profile associated with a user and including images of a plurality of checks associated with the user, each check of the plurality of checks having a check type;

evaluating, by the at least one processor, each image retrieved from the profile database to identify the check type for each check;

determining, by the at least one processor and based on the identified check type, a number of checks of each check type in the document profile;

comparing, by the at least one processor, a number of checks of a first check type to a threshold number;

if it is determined that the number of checks of the first check type is below the threshold number, storing, by the at least one processor, the images in the document profile;

if it is determined that the number of checks of the first check type is above the threshold number:

further evaluating, by the at least one processor, each check of the first check type to identify one or more checks for deletion;

refreshing, by the at least one processor, the document profile including deleting the identified one or more checks for deletion; and generating, by the at least one processor, a user interface including the refreshed document profile.

9. The method of claim 8, wherein further evaluating each check of the first check type to identify one or more checks for deletion further includes:

identifying, by the at least one processor, a date associated with each check of the first check type;

comparing, by the at least one processor, the date associated with each check of the first check type to a threshold date;

if it is determined that a date of a check is earlier than the threshold date, identifying, by the at least one processor, the check for deletion; and if it is determined that the date of the check is later than the threshold date, storing, by the at least one processor, the check.

10. The method of claim 8, wherein further evaluating each check of the first check type to identify one or more checks for deletion further includes:

identifying, by the at least one processor, a date associated with each check of the first check type;

identifying, by the at least one processor, a check of the first check type having an oldest date; and identifying, by the at least one processor, the check of the first check type having the oldest date for deletion.

11. The method of claim 8, further including:

prior to retrieving the document profile:
receiving, by the at least one processor, a check image;
extracting, by the at least one processor, data from the check image; and
retrieving, by the at least one processor, the document profile based, at least in part, on the extracted data.

12. The method of claim 11, wherein the extracted data includes a payer associated with the check image.

13. The method of claim 8, further including:

prior to retrieving the document profile:
receiving, by the at least one processor, a check image; and
enabling, by the at least one processor, profile control functions responsive to receiving the check image.

14. The method of claim 8, wherein the plurality of checks includes a plurality of checks images.

15. One or more non-transitory computer-readable media storing instructions that, when executed by a computing platform comprising at least one processor, memory, and a communication interface, cause the computing platform to:

retrieve, from a user profile database, a document profile associated with a user and including images of a plurality of checks associated with the user, each check of the plurality of checks having a check type;
evaluate each image to identify the check type for each check;
determine, based on the identified check type, a number of checks of each check type in the document profile;
compare a number of checks of a first check type to a threshold number;
responsive to determining that the number of checks of the first check type is below the threshold number, storing the images in the document profile;
responsive to determining that the number of checks of the first check type is above the threshold number:
further evaluate each check of the first check type to identify one or more checks for deletion;
refresh the document profile including deleting the identified one or more checks for deletion; and
generate a user interface including the refreshed document profile.

16. The one or more non-transitory computer-readable media of claim 15, wherein further evaluating each check of the first check type to identify one or more checks for deletion further includes:
identifying a date associated with each check of the first check type;
comparing the date associated with each check of the first check type to a threshold date;
responsive to determining that a date of a check is earlier than the threshold date, identifying the check for deletion; and
responsive to determining that the date of the check is later than the threshold date, storing the check.

17. The one or more non-transitory computer-readable media of claim 15, wherein further evaluating each check of the first check type to identify one or more checks for deletion further includes:
identifying a date associated with each check of the first check type;
identifying a check of the first check type having an oldest date; and
identifying the check of the first check type having the oldest date for deletion.

18. The one or more non-transitory computer-readable media of claim 15, further including instructions that, when executed, cause the computing platform to:
prior to retrieving the document profile:
receive a check image;
extract data from the check image; and
retrieve the document profile based, at least in part, on the extracted data.

19. The one or more non-transitory computer-readable media of claim 18, wherein the extracted data includes a payer associated with the check image.

20. The one or more non-transitory computer-readable media of claim 15, further including instructions that, when executed, cause the computing platform to:
prior to retrieving the document profile:
receive a check image; and
enable profile control functions responsive to receiving the check image.

21. The one or more non-transitory computer-readable media of claim 15, wherein the plurality of checks includes a plurality of checks images.

* * * * *